though it has not reached perfect maturity, which condition is indicated by the veinlets of the leaf becoming yellowish white on the back of the leaf, and which is the customary condition at the time of harvest.

UNITED STATES PATENT OFFICE.

ERNEST G. BEINHART, OF WASHINGTON, DISTRICT OF COLUMBIA.

PROCESS OF CURING TOBACCO.

1,327,692. Specification of Letters Patent. Patented Jan. 13, 1920.

No Drawing. Application filed May 8, 1919. Serial No. 295,726.

(FILED UNDER THE ACT OF MARCH 3, 1883, 22 STAT. L., 625.)

*To all whom it may concern:*

Be it known that I, ERNEST G. BEINHART, a citizen of the United States, and an employee of the United States Department of Agriculture, residing in the city of Washington, D. C., (whose post-office address is % Department of Agriculture, Washington, D. C.,) have invented certain new and useful Improvements in Processes of Curing Tobacco, of which the following is a specification.

This application is made under the provisions of the act of March 3, 1883, chapter 143 (22 Stat., 625), and the invention herein described and claimed may be used by the Government of the United States or any of its officers or employees in the prosecution of work for the Government, and also by any person in the United States, without payment to me of any royalty thereon.

This invention relates to the curing of tobacco by means of conditioned and controlled air and has for its object the rendering of the curing process more expeditious, to better assure the finished colors, texture, quality of leaf, to entirely remove the (natural) danger of attack by fungi and other parasites, and to appreciably shorten the time of curing.

In the curing of tobacco the leaves are plucked from the stalk and hung on strings attached to lath or sticks, or the whole plant is cut and hung in the curing barn, with or without previous treatment. The leaves are then subjected to the varying conditions of the air, either with or without moisture or temperature control, when the tobacco goes through the several stages of curing. As generally practised no control is had in air curing, whereas in the curing of the so-called bright tobaccos and fire cured types control is had in varying degrees by the use of heat supplied by radiation from flues, steam coils or open fires.

In air cured tobaccos certain results are sought in each district where the tobaccos are raised and these effects differ in the several districts or types within a district. As ordinarily practised the several cures are unrelated in practice but in the system which I have devised where the conditions can be fully controlled there arise certain important methods of processing the different types to properly fit them for commercial use.

The tobacco industry recognizes among air cured types wrapper leaf, binders and fillers for cigar purposes and leaf for the so-called manufacturing types for use in cigarettes, cheroots, smoking, chewing and snuff. Within a district one or more of the grades are raised, but it frequently occurs as in the production of cigar wrappers that only a minority percentage is suitable for wrapper purposes, the inferior leaves being consigned to the less valuable grades of binder and filler. This is due in part to the position of the leaf on the plant as well as to the condition of the cure. With the improved process of curing which I have devised, a substantial improvement in the finished leaf is found. Within certain reasonable limits of maturity of leaf at harvest and of controlled air conditions in the curing unit I have found that a very wide range of finished colors and quality of leaf may be secured by variation of the temperature and humidity of the air surrounding the leaf.

In the curing of cigar wrapper leaf the object sought is to produce a leaf of thin texture, strong leaf body, fine venation, sufficient oils and gums within the leaf and on the surface to retain elasticity, and a color ranging through the lighter shades of brown free from red, and overlaid with a faint olive green cast, possessing a dull even luster.

Maturity of leaf at time of harvest is an important factor in determining the color of the cured leaf, and I have found by experiment that the preferred color as described above is more easily secured in the cure of primed tobacco by using a leaf which has attained 95% of its maturity and whose veinlets have not begun to lighten in color from green to faint yellow, and which will only crease on folding (and not break) between the fingers, indicating the absence of complete starch storage, that is a leaf ordinarily lacking about five days to normal maturity or ripeness.

In stalk cut cigar wrapper and binder tobaccos the same conditions of ripeness is used to determine the moment of harvest, using the sixth or ninth leaves from the bottom of the plant as the criterion for wrappers and binders and the tenth to twelfth leaf on the plant from the bottom, for filler tobacco.

In harvesting tobaccos to be used for manufacturing purposes such as the burleys the plant is allowed to become fully ripe to the top of the plant. The color of the preferred finished leaf should be of light yellowish cast, brown with a light ground color. Some shades of red are found in the burley as ordinarily cured.

In my experience during which I have worked with all types of tobacco and have cured all of the major type grades, for wrappers, binders, and also those for manufacturing purposes, in ordinary curing I have found that the optimum condition for curing the several types seldom exist for more than a short time of the day, with the result that for a cure as ordinarily done in barns without control 20 to 40 days are required to complete the cure. In my experiments where I have full control of the air conditions I have, by the application of my process and processes to be hereafter described, reduced the time for cure to five and one half days. By these processes I have secured a higher percentage of desired colors with a corresponding reduction in the inferior colors, and I have improved the tobacco in all other respects of quality and removed entirely the danger of parasitic infection with the attendant loss and damage.

In the application of my process for curing of primed wrapper tobacco, I have found it very important:

*First stage.*

To wilt the hanging leaf in the curing unit at the beginning of the cure. Rapid drying conditions are maintained about the leaf, preferably a temperature of 108°–120° F. and a relative humidity of 50 per cent. These conditions are maintained usually no longer than two hours or until 5 to 12% of the original weight of the leaf is lost. In this part of the process the epidermal cells of the leaf are partially killed depositing at the leaf surface a thin film of nontransformed chlorophyll which produces in the finished cured leaf an overcast of green on the surface. The variations of the amount of moisture to be abstracted depend upon the position of the leaf on the stalk (*i. e.* bottom, middle or top), and the degree of ripeness at harvest. This initial loss of moisture has always produced in my experiments leaf of bright colors, more elastic texture, better grain conglomeration and a reduction in the time required for the cure. It is important, however, that it not be carried too far.

*Second stage.*

At the beginning of the third hour or thereabout of the cure the temperature is lowered to 90° F. and the humidity is raised to 95% rel. and maintained for 48 hours or until the end of the fiftieth hour of the cure or thereabout, or until there is a distinct change in the color of the leaf's surface, featured by the disappearance of chlorophyll in the leaf principally in the veinlets and to a less extent in the cells of the mesophyll, with the formation of small yet more or less distinct areas of yellow.

With primed leaves from the upper part of the plant the period required to produce the changes within the leaf, and as marked by the changes of color on the leaf surface just described, is extended to seventy-two hours instead of forty-eight hours as just described for the lower leaves. This longer period is required because of the larger amount of leaf material to be cured as determined by the thickness of leaf per unit of area.

*Third stage.*

At the end of the fiftieth hour for lower leaves and the seventy-fourth hour for upper leaves the humidity is reduced gradually from 95 per cent., or thereabout, to 72 per cent. or thereabout, and the temperature raised from 90° F. to 112° F., or thereabout. These conditions are maintained for 72 hours, *i. e.*, on first pickings to the one hundred twenty-second hour of the cure and on upper pickings to the one hundred forty-sixth hour of the cure, or until the colors pass from green-yellow mottle produced in the second stage to a full yellow mottle and yellow wash with the desired brown forming after the yellow wash. In my experiments I have found that by maintaining the conditions just described, at the end of the one hundred and twenty-two hours the whole leaf and mid-rib in the leaves picked from the lower part of the plant are usually cured, and in leaves from the upper part of the plant one hundred and forty-six hours are required.

I have found it important to hold the temperature near to 112° as any appreciable rise above that point causes intensive cell action, forcing the products of starch decomposition to the leaf surface. A lower temperature prolongs the time required. Also, I found that the humidity should be maintained within close limits to that described (72 per cent.) as a higher humidity occasions a more rapid hydrolysis within the leaf, approaching in its result the same as that of higher temperature. An appreciably lower humidity causes too rapid dehydration, checking necessary action both in color and texture of the finished leaf.

In practice it is quite impossible to harvest leaves absolutely similar in their maturity and in my experiments I have found that with unripe leaves there is a delayed action in the curing of the mid-rib or stem. By using over-ripe tobacco the cure is hastened.

*Fourth stage.*

I have found in my experiments that variation in the humidity of the air surrounding the leaf possessing undried or partly dried veins, veinlets and midribs called in the trade "fat stems," causes a more rapid drying of the midribs or veins, and veinlets than a constant humidity of low or medium relative humidity. This contained moisture may exist in the whole of the stem, vein or veinlets, or be in one or more so-called pocket, *i. e.*, in areas containing a large amount of moisture which is surrounded by areas containing less moisture or totally cured. And in practice, areas have frequently been observed in the leaf tissue where the conductive tissue is similarly clogged, checking the progress of the cure of the leaf. If such uncured stems, veins, veinlets or leaf areas remain at the end of the period described (one hundred and twenty-two hours and one hundred and forty-six hours), their drying is facilitated by maintaining the temperature and varying the humidity,—raising from 72 per cent. to 90 per cent. period of one hour when the humidity is decreased to 50 per cent. and held there for two hours. The air conditions are alternated in this manner, varying the humidity in periods of 1, 2 or 4 hours from 90% to 50% depending upon the characteristics of the leaf, until the cells of the midrib break and give up their contained moisture; with normal tobaccos this can usually be accomplished in twelve to fourteen hours with first pickings and in twenty to twenty-four hours with upper pickings, completing the cure of normal lower leaves in one hundred and thirty-four hours and of upper leaves, or those with large midribs, within one hundred and sixty hours.

I also found that to secure red leaf, which is the so-called red or reddish brown shade recognized in the trade, the process described above for cigar wrappers is modified in that the initial wilt is not given. After the leaf is hung in the curing unit it is subjected to air conditions of 90° F. and 95% humidity for seventy-two hours, or until the leaf has passed from the green to green mottle, green-yellow mottle, yellow mottle and yellow wash stages, denoting the disappearance of most or all of the chlorophyll from the veinlets and the cells between; and in the yellow wash stage when the chlorophyll has disappeared from nearly all of the mesophyll and veins. The humidity is then lowered to 80 per cent. and the temperature raised to 108° to 112° or thereabout, which conditions are held for twelve hours or to the end of the eighty-fourth hour of the cure. The temperature is allowed to remain at 108° to 112° and the relative humidity is lowered to 72 per cent. or thereabout, for thirty-six hours, or until the leaf has assumed the light brown or red shades over its entire surface (one hundred and twentieth hour).

Because of the heavier nature of the leaf usually employed to produce this type of tobacco, I have found that the midribs especially, and sometimes the base of the larger veins, offer an obstinate resistance. To overcome this resistance in the heavier leaves I employ alternating air conditions, starting at the one hundred and twenty-first hour by raising the humidity to 90 per cent. and maintaining the temperature at 108° to 112° F. for six hours, or thereabout (one hundred and twenty-sixth hour) and then lowering the humidity to 70 per cent. for six hours (one hundred and thirty-second hour). This is continued until all of the midribs are dried (cured), which usually requires a total of one hundred and sixty hours to complete with primed tobacco that is (and I have found should be) harvested fully ripe.

If in practice it is necessary to harvest binder or filler tobacco green or before full maturity, I extend my initial period to ninety-six hours (90°—95%), thus making a total time requirement of one hundred and eighty-four hours.

*Curing stalk tobacco.*

Where it is desired to cure on the stalk the so-called red tobaccos, such as cigar binder and fillers or burley, I have found in my experiments that these tobaccos should be harvested fully ripe, *i. e.*, all of the leaves on the plant should be matured or should approach full maturity, and I have found that the best results are secured by subjecting the leaf to the conditions of 90° F. 95% humidity for ninety-six hours, then raising the temperature to 108°—112° and lowering the humidity to 72%. This second stage (108°—72%) continues ninety-six hours (one hundred and ninety-second hour) when the temperature is lowered to 90° and the humidity raised to 95% for thirty-six hours (two hundred and twenty-eighth hour). Beginning with the two hundred and twenty-ninth hour the temperature is raised to 108°—112° F. and the humidity is lowered to 72%, which continues for twenty-four hours (two hundred and fifty-third hour). The humidity is then alternated each fourth hour for thirty-six hours, 72% and 95%

(two hundred and eighty-ninth hour) to force the more rapid curing of the stems, particularly near the base.

This method I have found in my experiments produces in stalk cut tobaccos which are usually cured by the air-cured method or some modification of that process, leaf of more desirable colors, superior texture and general quality.

I claim:

1. The process of curing tobacco by subjecting the leaf harvested separately or harvested upon the stalk or part of the stalk to the action of air possessing a temperature of about 105° F. and a drying action of a humidity preferably about 60% relative humidity to lower the moisture content of the green leaf and establish a film of dead chlorophyll cells in the leaf surface to form a green overcast, thence subjecting the leaf to air possessing a temperature of 90° F. or thereabout, and a relative humidity of 95%, or thereabout, for forty-eight hours more or less, to bring the leaf color to yellow-mottle or yellow wash stage, then raising the temperature of air to about 105° F. and lowering the humidity of the air to 72% relative humidity, or thereabout, maintaining this condition for forty-eight to seventy-two hours on the leaves primed or picked (from the lower part of the plant, and leaves picked from the upper part of the plant), or until the color of the leaf has passed from the yellow-mottle or yellow wash stage into the brown stage, the whole surface of the leaf and veins assuming the characteristic color, texture, grain conglomeration, body and quality of well cured tobacco.

2. The process of curing tobacco by subjecting the leaf for substantially two hours to air at preferably approximately 112° F., and a relative humidity of 50 per cent., to extract moisture from the leaf equal to five to twelve per cent. of the leaf weight, and to kill a small portion of the chlorophyll in the epidermal cells of the leaf in order to produce a green overcast in the finished leaf, then subjecting the leaf or leaves to air possessing a temperature of 90° F., or thereabout, and a relative humidity of 95%, or thereabout, from forty-eight to seventy-two hours for normal subripe tobacco leaves harvested from the lower and upper part of the plant, and for a proportionately less or greater time of exposure as the maturity of the leaf may deviate from the condition of subnormal ripeness, or until the leaf assumes a yellow mottle or yellow wash stage, then raising the temperature to about 105° and lowering the humidity to 72% relative humidity, or thereabout, or until the color of the leaf has passed from the yellow mottle or yellow wash stage to the brown stage, the whole surface of the leaf, veins and midribs assuming the characteristic type color, texture, grain conglomeration, body and quality of the normal type of tobacco acted upon or any modifications naturally arising from any treatment to the curing process.

3. The process of curing tobacco by subjecting the leaf for substantially two hours to air at preferably approximately 112° F., and a relative humidity of 50 per cent., to extract moisture from the leaf equal to five to twelve per cent. of the leaf weight, and to kill a small portion of the chlorophyll in the epidermal cells of the leaf in order to produce a green overcast in the finished leaf, then subjecting the leaf or leaves to air possessing a temperature of 90° F., or thereabout, and a relative humidity of 95%, or thereabout, from forty-eight to seventy-two hours for normal subripe tobacco leaves harvested from the lower and upper part of the plant, and for a proportionately less or greater time of exposure as the maturity of the leaf may deviate from the condition of subnormal ripeness, or until the leaf assumes a yellow mottle or yellow wash stage, then raising the temperature to about 105° and lowering the humidity to 72% relative humidity, or thereabout, or until the color of the leaf has passed from the yellow mottle or yellow wash stage to the brown stage, the whole surface of the leaf, veins and midribs assuming the characateristic type color, texture, grain conglomeration, body and quality of the normal type of tobacco acted upon or any modifications naturally arising from any treatment to the curing process, then, to break down fat stem and uncured leaf area, subjecting the leaf to a variable humidity ranging between 95% and 50% relative humidity at temperature sufficient to break down the conductive and connective tissue of the leaf, veinlets, veins and midribs by softening the hardened tissues and by transference carrying off the contained solutions and distributing it along the adjoining drier material.

ERNEST G. BEINHART.